United States Patent
Tang (10) Patent No.: US 9,277,488 B2
(45) Date of Patent: Mar. 1, 2016

(54) METHOD FOR SCANNING WIRELESS CHANNELS, APPARATUS AND SYSTEM FOR USING THE SAME

(76) Inventor: Sung Chien Tang, Hsinchu County (TW)

( * ) Notice: Subject to any disclaimer, the term of this patent is extended or adjusted under 35 U.S.C. 154(b) by 1216 days.

(21) Appl. No.: 12/614,738

(22) Filed: Nov. 9, 2009

(65) Prior Publication Data

US 2010/0265930 A1 Oct. 21, 2010

(30) Foreign Application Priority Data

Apr. 20, 2009 (TW) ................................ 98112961 A (51) Int. Cl.
*H04W 4/00* (2009.01)
*H04W 48/16* (2009.01)
*H04W 84/12* (2009.01)

(52) U.S. Cl.
CPC .............. *H04W 48/16* (2013.01); *H04W 84/12* (2013.01)

(58) Field of Classification Search
USPC ......................................................... 455/434
See application file for complete search history.

(56) References Cited

U.S. PATENT DOCUMENTS

| | | | |
|---|---|---|---|
| 2005/0239463 A1* | 10/2005 | Lagnado ..................... | 455/435.2 |
| 2005/0245269 A1* | 11/2005 | Demirhan et al. ......... | 455/452.1 |
| 2006/0256742 A1* | 11/2006 | Lee et al. .................... | 370/278 |
| 2008/0019287 A1* | 1/2008 | Hong ........................... | 370/254 |
| 2008/0064404 A1* | 3/2008 | Zhang et al. ................. | 455/436 |
| 2008/0130519 A1* | 6/2008 | Bahl et al. .................... | 370/254 |
| 2008/0144584 A1* | 6/2008 | Sugaya ................. | H04W 74/04 370/336 |
| 2008/0205340 A1* | 8/2008 | Meylan et al. ................ | 370/331 |
| 2008/0205352 A1* | 8/2008 | Chu et al. ..................... | 370/336 |
| 2008/0280621 A1* | 11/2008 | Soomro ............... | H04W 48/08 455/450 |
| 2008/0305757 A1* | 12/2008 | Jang ....................... | H04H 60/43 455/150.1 |
| 2009/0003278 A1* | 1/2009 | Abdel-Kader et al. ....... | 370/331 |
| 2009/0109995 A1* | 4/2009 | Alam et al. ................... | 370/463 |
| 2010/0246554 A1* | 9/2010 | Alapuranen et al. ......... | 370/343 |

FOREIGN PATENT DOCUMENTS

TW 200507523 2/2005

OTHER PUBLICATIONS

Office Action dated Dec. 24, 2012 from TW counterpart application No. 098112961.
English Abstract of Office Action dated Dec. 24, 2012 from TW counterpart application No. 098112961.
English Abstract of TW 200507523.

* cited by examiner

*Primary Examiner* — Brandon Renner
(74) *Attorney, Agent, or Firm* — WPAT, P.C.; Anthony King (57) ABSTRACT

In order to obtain information related to operating channels of access points, the method receives lightweight beacons on a common channel. The method generates a channel scanning list in accordance with the content of the lightweight beacons and sequentially scans all the channels on the list. The method is capable of reducing the scanning time and the data loss rate during the scanning operation.

11 Claims, 7 Drawing Sheets

METHOD FOR SCANNING WIRELESS CHANNELS, APPARATUS AND SYSTEM FOR USING THE SAME

BACKGROUND OF THE INVENTION

1. Field of the Invention

The present invention relates to a communication system, and more particularly, to a method and apparatus for scanning wireless channels.

2. Description of the Related Art

Wireless local area network (WLAN) technology is now widely used in various applications. Numerous organizations devote extensive resources to research seeking improvements in WLAN data communication quality. In a WLAN, a wireless transmit/receive unit (WTRU) may be located within communication range of several access points (APs). However, the AP associated with the WTRU and the channel the WTRU operates on may change over time due to signal strength variations. On the other hand, when is the WTRU roams among various APs, the channel utilized may be adjusted in accordance with a location of the WTRU and the signal quality. Before the WTRU can be associated with an AP, a handoff procedure has to be performed. The handoff procedure includes a scanning phase, an authentication phase and a re-association phase, and the scanning phase incurs significant delay.

Figure 1:
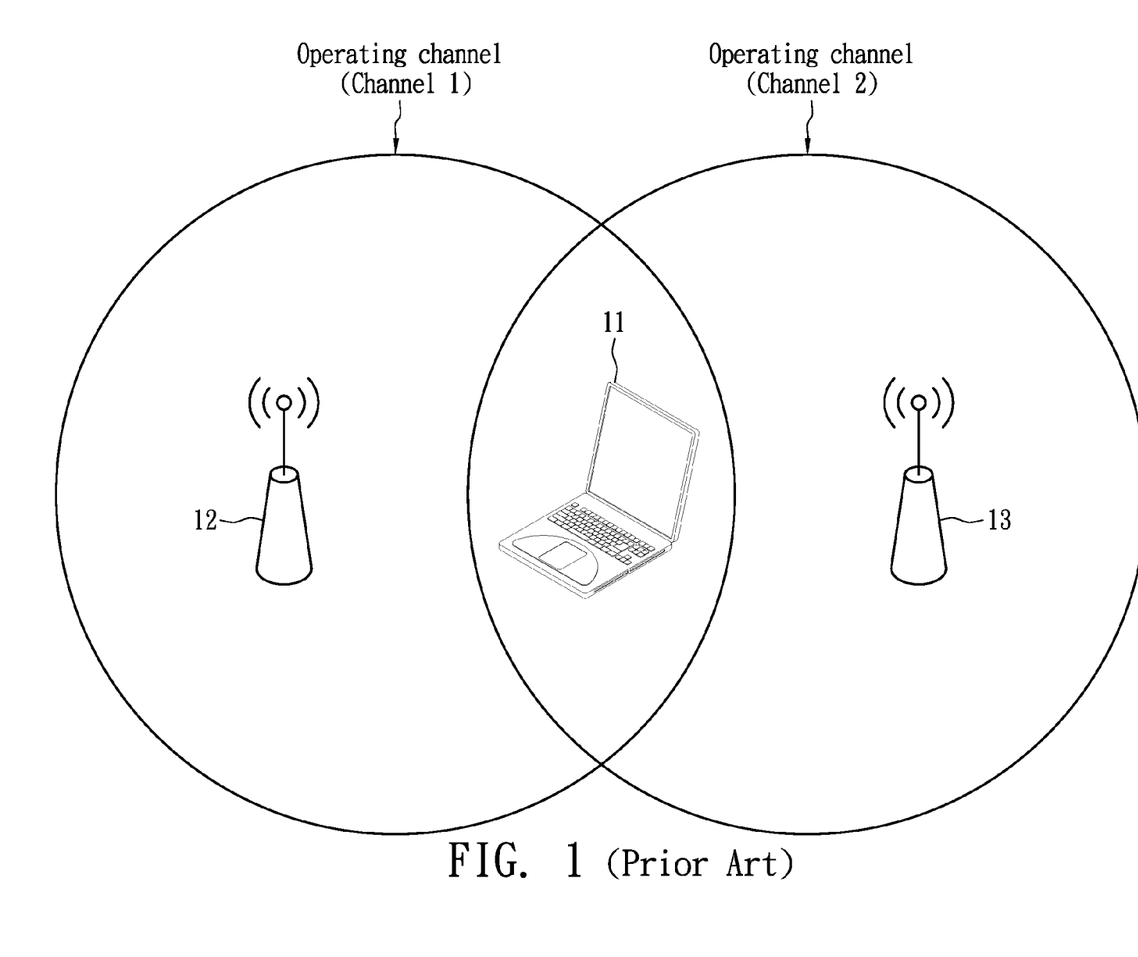
FIG. 1 illustrates a diagram for a wireless network.

FIG. 1 illustrates a diagram for a wireless network. The network comprises a station 11, and AP 12, 13. The operating channel of the AP 12 is channel 1, and the operating channel of the AP 13 is channel 2. A channel scanning procedure has to be performed for the station 11 to obtain the related information of all APs within the signal communication range of the station 11. The related information includes service set identifiers (SSIDs), the signal strength of every detected AP, encryption modes, etc. The two currently available modes for scanning are active scanning and passive scanning. However, both active scanning and passive scanning interrupt the operations to transmit or receive packets. If the station 11 is a dual-band station that can be operated on 38 operating channels, and 140 ms is required to scan each channel, then the station 11 needs 5320 ms to scan all channels. That is, the station 11 would need to stop communicating with an associated AP for 5320 ms in order to complete the operation of scanning all channels. Because the data forwarding and data receiving operations are interrupted during this period, important packets could be lost. Therefore, finding ways to reduce the scanning time and the data loss rate during the scanning operation is an important issue for the market.

SUMMARY OF THE INVENTION

The method and apparatus of the present invention use lightweight beacons received on a common channel to obtain information related to operating channels of access points. The method generates a channel scanning list in accordance with the content of the lightweight beacons and is sequentially scans all the channels on the list.

One embodiment of the present invention discloses a wireless channel scanning method. The method comprises the steps of: recording a current operating channel; switching to a common channel and receiving at least one lightweight beacon on the common channel; generating at least one channel scanning list in accordance with the at least one lightweight beacon; and scanning at least one channel in accordance with the channel scanning list.

Another embodiment of the invention discloses a wireless channel scanning apparatus comprising a receiving unit, a generating unit, a scanning unit and a recording unit. The receiving unit is configured to receive at least one lightweight beacon on at least one common channel and to receive at least one standard beacon on at least one operating channel. The generating unit is configured to generate a channel scanning list in accordance with the content of the lightweight beacon. The scanning unit is configured to scan channels in order in accordance with the channel scanning list. The recording unit is configured to record the operating channel.

Another embodiment of the invention discloses a system comprising a station and an access point. The station receives at least one standard beacon on an operating channel and receives at least one lightweight beacon on a common channel. The access point broadcasts the at least one standard beacon on the operating channel and broadcasts the at least one lightweight beacon on the common channel, wherein the standard beacon includes the channel information of the common channel and the lightweight beacon includes the channel information of the operating channel of the access point.

BRIEF DESCRIPTION OF THE DRAWINGS

The invention will be described according to the appended drawings in which.

PREFERRED EMBODIMENT OF THE PRESENT INVENTION

Figure 2:
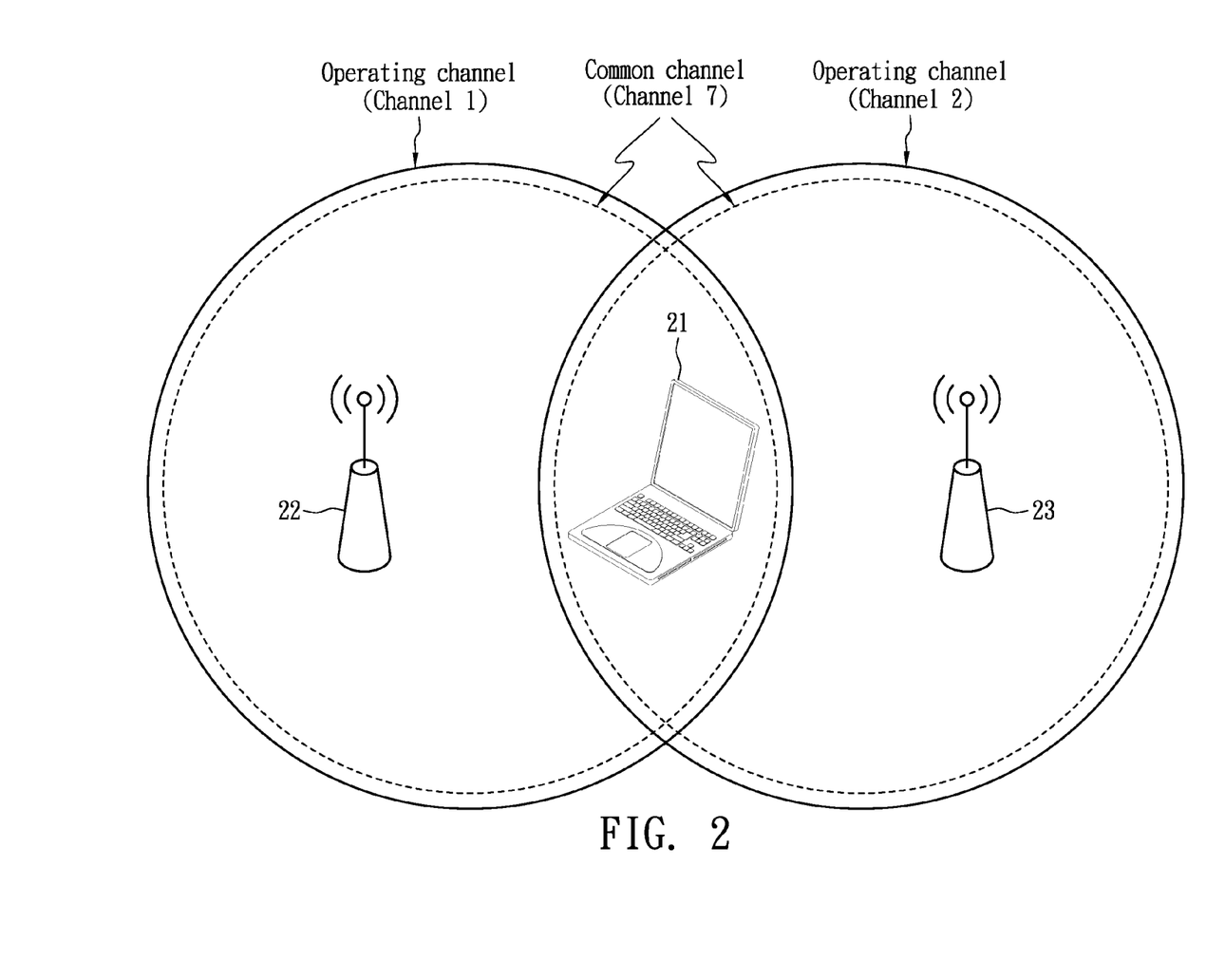
FIG. 2 shows a diagram for a wireless network in accordance with one embodiment of the present invention.
Figure 3:
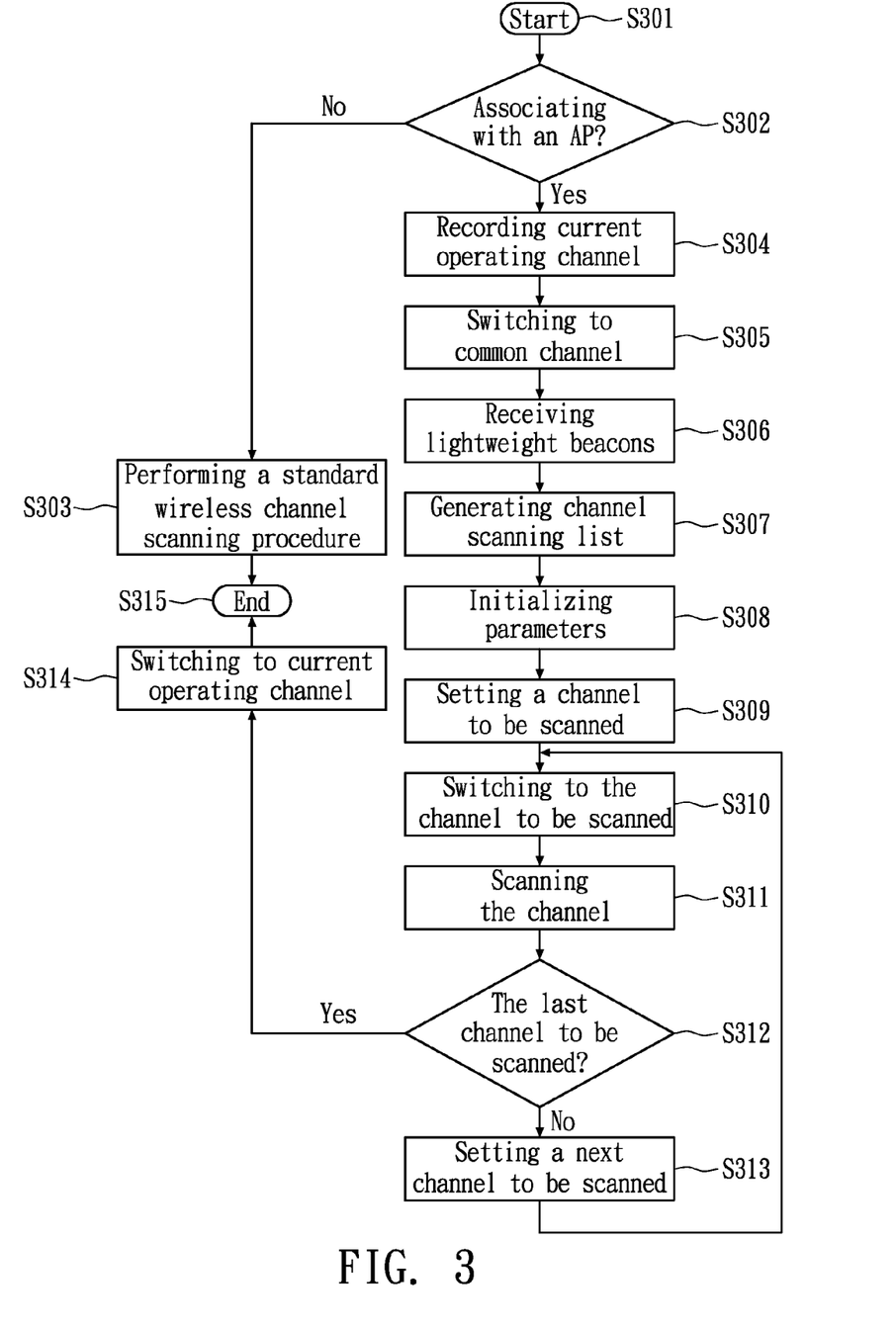
FIG. 3 shows a flowchart illustrating one embodiment of the wireless channel scanning method of the present invention.

FIG. 2 shows a diagram for a wireless network in accordance with one embodiment of the present invention. The wireless network includes a station 21, an AP 22 and an AP 23. The operating channels for the AP 22 and the AP 23 are channel 1 and channel 2, respectively. The common channel for the AP 22 and the AP 23 is channel 7. The signal communication ranges for the operating channels and the common channel in FIG. 2 are used for illustration purpose only. FIG. 3 shows a flowchart illustrating one embodiment of the wireless channel scanning method of the present invention. In step S301, a channel scanning procedure is activated for the station 21. In step S302, it is determined whether the station 21 has connected with an AP. If the station 21 has not connected with any AP, a standard wireless scanning procedure is performed in step S303. According to the IEEE 802.11 standard, the scanning phase scans all channels in order is to determine which channels a station can utilize. The two currently available modes for scanning are active scanning and passive scanning. For active scanning, a station selects a channel and sends a broadcast probe request frame and then waits a predetermined period of time. If no probe response frame is transmitted by the AP(s) in response to the probe request frame within the predetermined period of time, the station selects a next channel and repeats the procedure. For passive scanning, a station simply goes to the channel of interest and passively listens for any periodic beacon frames or the probe response frames sent out by AP(s). If no periodic beacon frame or probe response frames is transmitted by the AP(s) within a predetermined period of time, the station selects a next channel and repeats the passive scanning operation. In step S315, the standard wireless scanning procedure is ended. If the station 21 has connected with an AP, e.g. the AP 22, a current operating channel, channel 1, is recorded in step S304. Normal beacons broadcasted by the AP 22 are received by the station 21 on channel 1.

Figure 4:
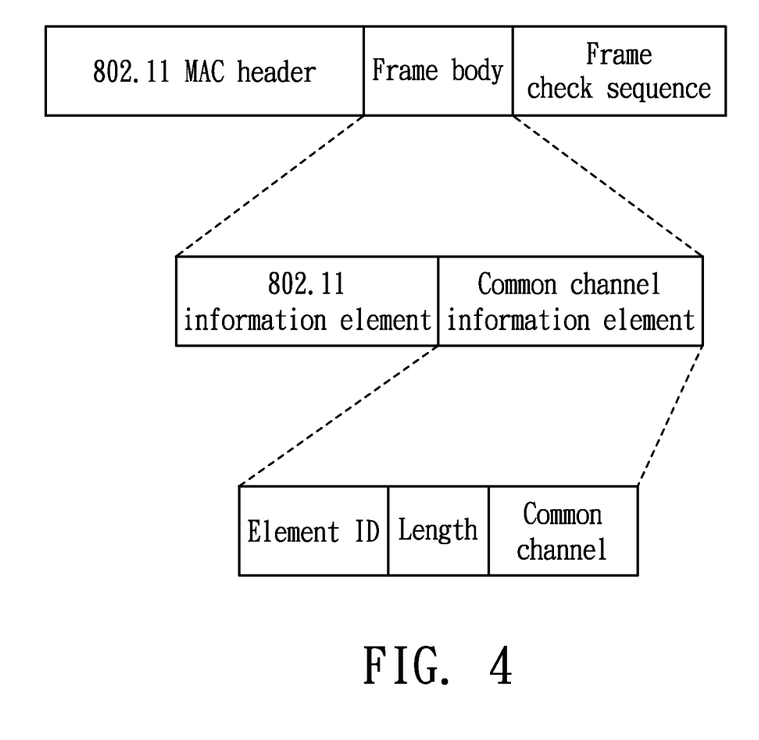
FIG. 4 shows the content of a standard beacon.

FIG. 4 shows the content of a standard beacon in accordance with one embodiment of the present invention. The content includes an 802.11 media access control (MAC) header, a frame body and a frame check sequence. The frame body includes an 802.11 information element (IE) and a common channel IE. The common channel IE includes an element IE, a length and common channel information. Therefore, a common channel, channel 7, is obtained by the station 21 in accordance with the content of the standard beacon.

Therefore, the operating channel, channel 1, is switched to the common channel, channel 7, in accordance with the common channel information obtained in step S305. In step S306, lightweight beacons broadcasted by all APs are received during a stay period.

Figure 5:
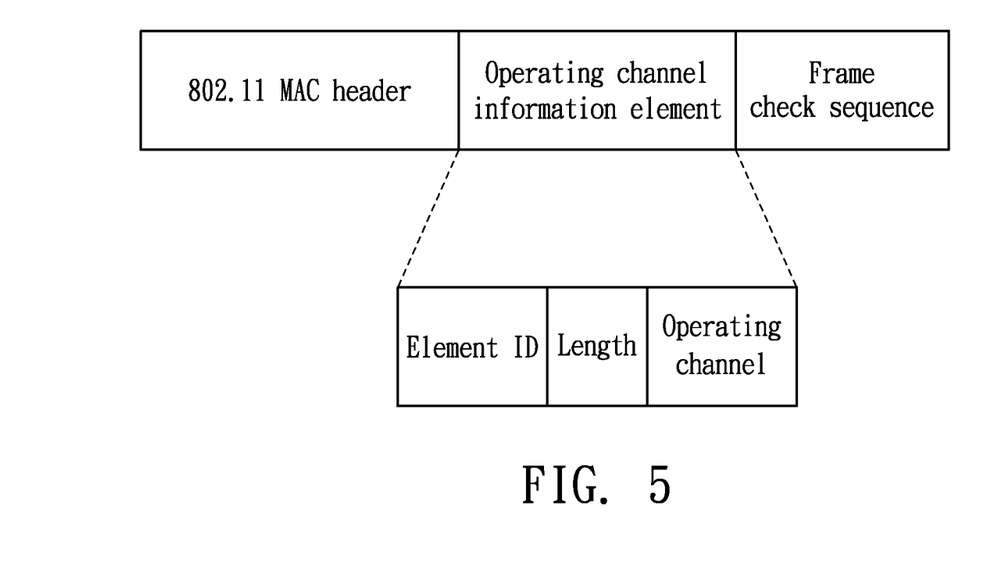
FIG. 5 shows the content of a lightweight beacon.

FIG. 5 shows the content of a lightweight beacon in accordance with one embodiment of the present invention. The content includes an 802.11 MAC header, an operating channel IE and a frame check sequence. The operating channel IE includes an element IE, a length, and operating channel information. For example, a lightweight beacon including operating channel information (channel 1) of the AP 22 is broadcasted by the AP 22, while a lightweight beacon including operating channel information (channel 2) of the AP 23 is broadcasted by the AP 23.

In step S307, a channel scanning list is generated. The channel scanning list includes channel 1 (the operating channel of the AP 22) and channel 2 (the operating channel of the AP 23). In step S308, scanning parameters are initialized. The scanning parameters include the number of channels to be scanned on the channel scanning list, a start-up scanning channel, a last channel to be scanned and a current operating channel. In this embodiment, the number of channels to be scanned is 2; the start-up scanning channel is channel 1; the last channel to be scanned is channel 2; and the current operating channel is channel 1. In step S309, the channel to be scanned is set to channel 1. In step S310, the station 21 switches from channel 7 to channel 1. In step S311, related information of APs operating on channel 1 is obtained by scanning channel 1. The related information of each AP includes at least a service set identifier, a signal strength and an encryption mode. An active scanning mode or a passive scanning mode can be used in step S311. After completing the scanning operation for channel 1, it is determined whether channel 1 is the last channel to be scanned. If channel 1 is not the last channel to be scanned, a next channel to be scanned is set and steps S310 to S312 are repeated until completion of the channel scanning operations of all channels to be scanned. If the channel scanned currently is channel 2, the station 21 switches from channel 2 to channel 1 in step S314. From the above, the wireless channel scanning method of the present invention obtains two operating channels (channel 1 and channel 2) according to the common channel (channel 7). The time spent for scanning channels can be reduced to 0.42 seconds (3×140 ms =420 ms).

In addition to the above-mentioned wireless channel scanning method, an apparatus for scanning wireless channels in accordance with another embodiment is described as follows to enable those skilled in the art to practice the present invention.

Figure 6:
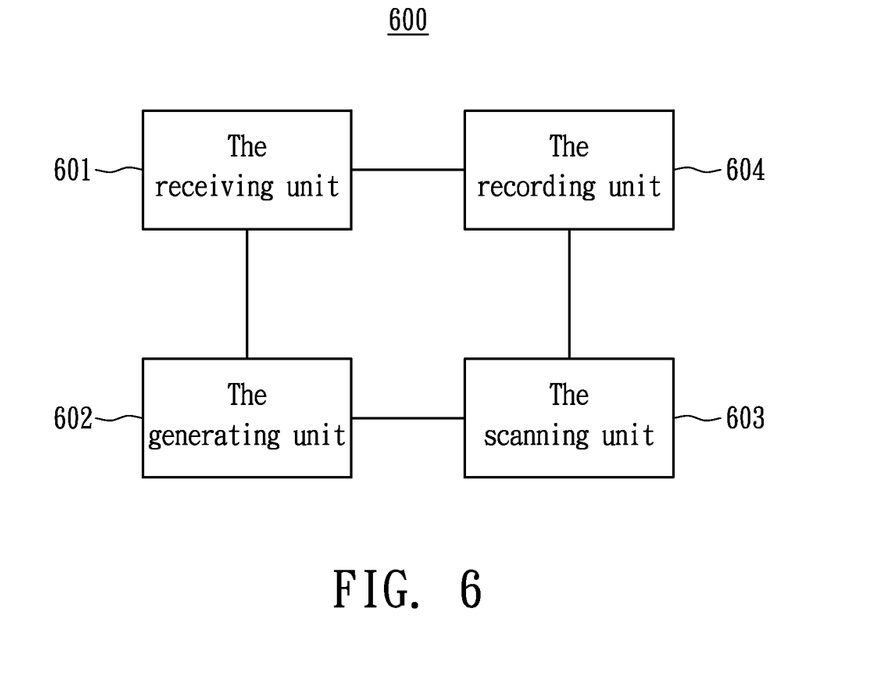
FIG. 6 illustrates a block diagram of the apparatus for scanning wireless channels in accordance with another embodiment of the present invention.

FIG. 6 illustrates a block diagram of the apparatus for scanning wireless channels in accordance with another embodiment of the present invention. The wireless channel scanning apparatus 600 comprises a receiving unit 601, a generating unit 602, a scanning unit 603 and a recording unit 604. The receiving unit 601 is utilized for receiving at least one lightweight beacon on at least one common channel and for receiving at least one standard beacon on at least one operating channel. The lightweight beacon includes operating channel information of an AP. The standard beacon includes the channel information of the common channel. In accordance with one embodiment of the present invention, if the AP is equipped with a communication system which broadcasts the standard beacon and the lightweight beacon at the same time on different channels, the standard beacon and the lightweight beacon are broadcasted by the AP on the operating channel and on the common channel respectively. Alternatively, the AP can also broadcast the standard beacon and the lightweight beacon with channel switching operations. If the AP is equipped with two PHYs, one PHY is utilized for broadcasting the lightweight beacon while the other PHY is utilized for broadcasting the standard beacon.

Figure 7:
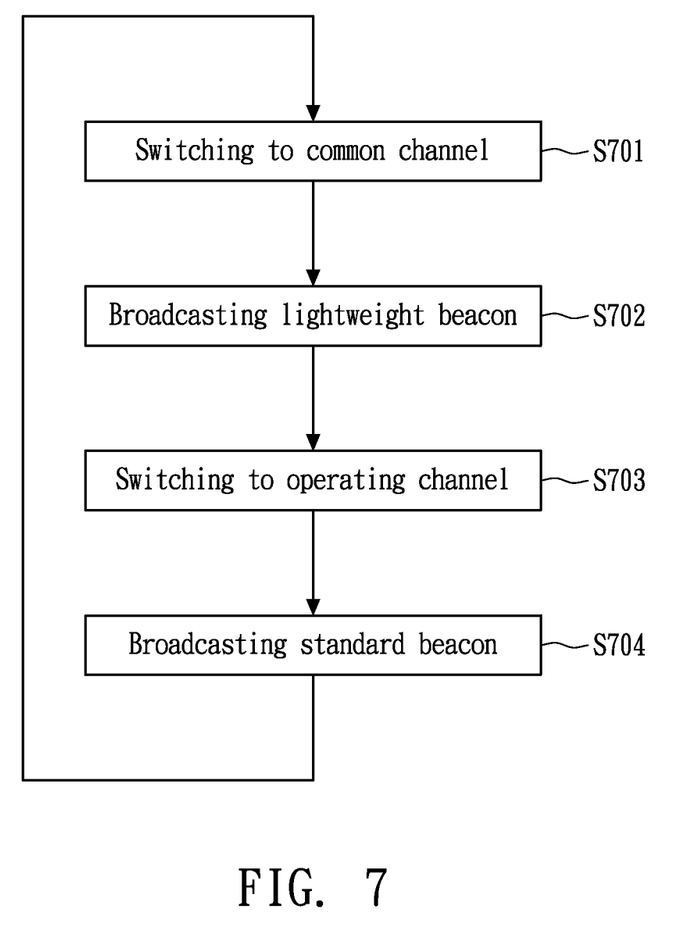
FIG. 7 shows a flowchart illustrating one embodiment of the channel switching method performed for broadcasting beacons.

FIG. 7 shows a flowchart illustrating the channel switching process performed by an AP equipped with one PHY to broadcast beacons. In step S701, a station switches from an operating channel to a common channel; in step S702 the station broadcasts a lightweight beacon. In step S703, the station switches back to the operating channel; in step S704 it broadcasts a standard beacon. The generating unit 602 of a station is utilized for generating a channel scanning list in accordance with the content of the lightweight beacon. The scanning unit 603 is utilized for scanning all the channels on the list sequentially, wherein the scanning unit 603 is set in an active scanning mode or a passive scanning mode. The recording unit 604 is utilized for recording the operating channel. The above-mentioned wireless channel scanning apparatus 600 can be implemented with software, firmware or hardware and any of a platform with single processor and a platform with multiple processors.

In summary, the method and the apparatus of the present invention receive lightweight beacons on a common channel to obtain information related to operating channels of access points. The method generates a channel scanning list in accordance with the content of the lightweight beacons and sequentially scans all the channels on the list. In contrast to conventional methods for scanning wireless channels, the method is capable of reducing the scanning time and the data loss rate during the scanning operation.

The above-described embodiments of the present invention are intended to be illustrative only. Numerous alternative embodiments may be devised by persons skilled in the art without departing from the scope of the following claims.

What is claimed is:

1. A method for scanning wireless channels, comprising the steps of:
    recording a current operating channel and receiving at least one standard beacon on the current operating channel, wherein the at least one standard beacon includes channel information of a common channel of at least two access points;
    switching to the common channel in accordance with the standard beacon and receiving at least two lightweight beacons broadcasted by the at least two access points on the common channel, wherein the at least two lightweight beacons comprise channel information of at least two operating channels of the at least two access points;

generating one channel scanning list including the at least two operating channels in accordance with the at least two lightweight beacons;

initializing scanning parameters, wherein the scanning parameters comprise the number of channels to be scanned on the channel scanning list, a start-up scanning channel, a last channel to be scanned and the current operating channel;

setting one of the channels to be scanned in accordance with the scanning parameters;

switching from the common channel to the one of the channels to be scanned in accordance with the scanning parameters; and scanning the one of the channels to be scanned in accordance with the scanning parameters.

2. The method of claim 1, wherein the receiving step is performed within a stay period.

3. The method of Claim 1, further comprising determining whether the one of the channels to be scanned in accordance with the scanning parameters is the last channel to be scanned.

4. The method of claim 3, wherein the determining step comprises switching to the current operating channel if the one of the channels to be scanned in accordance with the scanning parameters is the last channel to be scanned.

5. The method of claim 1, wherein an active scanning mode is utilized for scanning the at least two operating channels.

6. The method of claim 1, wherein a passive scanning mode is utilized for scanning the at least two operating channels.

7. An apparatus for scanning wireless channels, comprising:

a processor, where the processor is configured to receive receiving at least one standard beacon on the current operating channel and to receive at least two lightweight beacons broadcasted by the at least two access points on a common channel of at least two access points, wherein the at least one standard beacon includes channel information of the common channel, and the at least two lightweight beacons comprise channel information of at least two operating channels of the at least two access points;

generate a channel scanning list including the at least two operating channels in accordance with the at least two lightweight beacons;

initialize scanning parameters, wherein the scanning parameters comprise the number of channels to be scanned on the channel scanning list, a start-up scanning channel, a last channel to be scanned and the current operating channel;

set one of the channels to be scanned in accordance with the scanning parameters;

switch from the common channel to the one of the channels to be scanned in accordance with the scanning parameters; and scan the one of the channels to be scanned in accordance with the scanning parameters.

8. The apparatus of claim 7, wherein an active scanning mode of the apparatus is utilized for scanning the at least two operating channels.

9. The apparatus of claim 7, wherein a passive scanning mode of the apparatus is utilized for scanning the at least two operating channels.

10. A system comprising a station and at least two access points, wherein the station receives at least one standard beacon on an operating channel and receives at least two lightweight beacons on a common channel of the at least two access points, and one of the at least two access points broadcasts the at least one standard beacon on the operating channel and broadcasts one of the at least two lightweight beacons on the common channel, wherein the standard beacon includes channel information of the common channel and the at least two lightweight beacons comprise channel information of the at least two operating channels of the at least two access points, wherein the station is further configured to:

generate a channel scanning list including the at least two operating channels in accordance with the at least two lightweight beacons;

initialize scanning parameters, wherein the scanning parameters comprise the number of channels to be scanned on the channel scanning list, a start-up scanning channel, a last channel to be scanned and the current operating channel;

set one of the channels to be scanned in accordance with the scanning parameters;

switch from the common channel to the one of the channels to be scanned in accordance with the scanning parameters; and scan the one of the channels to be scanned in accordance with the scanning parameters.

11. The system of claim 10, wherein the access point broadcasts the standard beacon and the lightweight beacon at the same time on the operating channel and on the common channel, respectively, or broadcasts the standard beacon and the lightweight beacon with channel switching operations.

\* \* \* \* \*